United States Patent

Louthan

[11] 3,839,812
[45] Oct. 8, 1974

[54] ANTI SNAGGING FISHHOOK

[76] Inventor: Clissolde L. Louthan, 7477 N. Wayland, Portland, Oreg. 97203

[22] Filed: July 11, 1973

[21] Appl. No.: 378,253

[52] U.S. Cl. .............................................. 43/43.6
[51] Int. Cl. ........................................... A01k 83/00
[58] Field of Search .................. 43/43.6, 43.4, 43.2

[56] References Cited
UNITED STATES PATENTS

| | | | |
|---|---|---|---|
| 889,356 | 6/1908 | Carpenter | 43/43.4 |
| 1,166,529 | 1/1916 | Kruse | 43/43.6 |
| 2,424,599 | 7/1947 | Burns | 43/43.4 |
| 2,501,753 | 3/1950 | Ayers | 43/43.6 X |
| 2,996,828 | 8/1961 | Williams, Jr. | 43/43.4 |
| 3,357,125 | 12/1967 | Jester | 43/43.4 |

Primary Examiner—Russell R. Kinsey
Assistant Examiner—Daniel J. Leach
Attorney, Agent, or Firm—Eugene M. Eckelman

[57] ABSTRACT

A fishhook including a guard for protecting the point of the hook against underwater obstacles such as weeds, twigs, and the like so that the hook will not snag. The guard comprises a loop portion adapted to hook on the back side of the fishhook barb. The hook has an eye bent at an angle to the shank which supports a bushing through which the line passes. The line has a friction engagement with the bushing. The guard is held on the barb portion of the hook by the pull of the line in combination with a friction engagement of the line in the bushing. In one embodiment, the hook is provided with an abutment forward of the bushing against which the guard engages when a fish is on the hook to prevent any possible displacement of the bushing.

9 Claims, 7 Drawing Figures

PATENTED OCT 8 1974           3,839,812

3,839,812

ANTI SNAGGING FISHHOOK

BACKGROUND OF THE INVENTION

This invention relates to new and useful improvements in anti-snagging fish hooks.

Fishhooks have heretofore been provided which have means intended to guard the point of the hook to prevent the hook from snagging on obstructions in the water. Such prior devices have not been entirely satisfactory, however, in view of the fact that their construction does not allow them to perform a necessary combination of functions, namely, to provide a positive connection on the hook for guarding the point as the hook is drawn through obstructions in the water and at the same time to be capable of easy release when a fish takes the hook. More particularly, some of the prior devices have projecting portions which catch on obstructions in the water to accidentally dislodge the device from its guarding position. Also, some of the devices use spring controlled devices which similarly are easily dislodged by obstructions in the water. In addition, previous devices have been expensive to manufacture.

SUMMARY OF THE INVENTION

According to the present invention and forming a primary objective thereof, an anti-snagging fishhook is provided which broadly has the combination of features whereby to maintain a good connection in its guarding position on the hook without possibility of dislodgement under normal conditions and which at the same time is simplified in construction and inexpensive to manufacture.

More particularly, an object of the present invention is to provide an anti-snagging device for fishhooks which has a flat loop type guard having one end adapted to be engaged behind a barb of the fishhook and having a connection at its other end with a line connected to the fish pole line, whereby the pull on the line from the hook and bait will maintain the device in its guarding position, and furthermore to provide in such a device a bushing mounted on the fishhook and receiving the line to the loop in a friction connection such that tension will always be applied to the loop even though the fish pole line has been slackened.

DETAILED DESCRIPTION OF PREFERRED EMBODIMENTS

Figure 1:
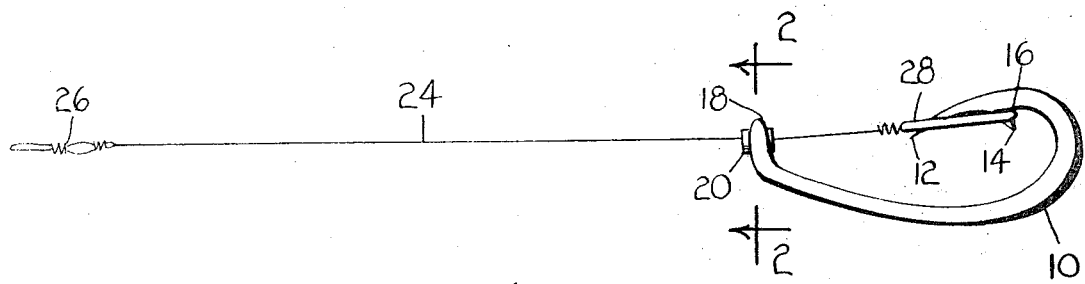
FIG. 1 is a side elevational view of an anti-snagging fishhook of the present invention.
Figure 2:
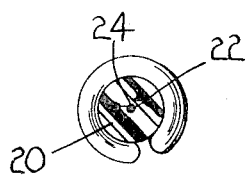
FIG. 2 is an enlarged sectional view taken on the line 2—2 of FIG. 1.
Figure 3:
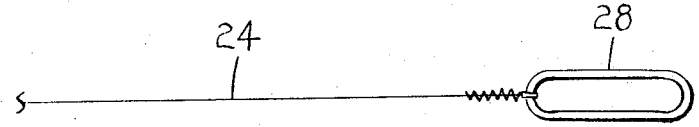
FIG. 3 is a plan view of a guard portion and line therefor shown apart from the hook.

Referring in particular to the drawings and first to FIGS. 1–3, a fishhook of the invention is designated by the numeral 10. Such hook has a point 12 and barb 14. As in the usual fishhook construction also, the barb 14 forms a V-shaped notch 16 with the curved shank portion of the hook.

The end of the hook opposite from the point 12 terminates in an eye 18, and in accordance with the present invention, such eye extends at an angle relative to the shank or body portion of the hook such that the axis of such eye is directed substantially toward the other end of the hook, namely, toward the point 12 and barb 14. The hook thus far described is conventional except for the particular disposition of the eye 18 since in most hooks such eye forms substantially an aligned extension of the shank or is bent angularly in the opposite direction from that shown.

Mounted in the eye 18 is a friction bushing 20 of rubber or suitable plastic having an axial opening 22 through which a line 24 extends. Axial opening 22 and line 24 are of selected size such that the latter has a friction engagement in the opening and will not slide freely therethrough. The size of the opening 22 and consequently the grip of its walls on the line 24 is controlled by the squeezed effect of eye 18 on the bushing. That is, the friction drag of the line 24 through the opening can be varied by the gripping force of the eye 18 on the bushing. Also, the type of line 24 used can assist in the friction drag through the bushing such as a rough surface line. An example of such line is plastic coated cable wherein the plastic coating is contoured with the strands of the cable to provide the rough surface.

Line 24 has a connection 26, such as a swivel connection, at one end for connection to a pole line or leader. The opposite end of line 26 has an elongated substantially rigid loop member 28 tied thereto which is adapted to hook behind the barb 14 and serve as an anti-snagging guard for the point of the fishhook. As best seen in FIG. 3, the loop member 28 is elongated and of narrow width. Its length is such that it will extend beyond the point of the hook when it is connected in the notch 16 so that the point of the hook if necessary can extend down through the loop. Loop member 28 has a minimum width and rounded corners so that it will not catch on obstructions in the water as the hook is worked in the water.

The loop member 28 and its line 24 are shown apart from the hook in FIG. 3 and are shown installed on the hook in FIG. 1. The loop member in the latter figure is shown in guarding or cocked position. To accomplish such guarding position, the loop and line are pulled through the bushing an amount sufficient to hook the loop member behind the barb. Thereupon, the line is pulled tight in the opposite direction to hold the loop member behind the barb. The friction engagement of the line 24 in the opening 22 in the bushing 20 holds the loop member on the barb whereby when the hook and fish line are being moved through the water, the loop member 28 will remain in guarding position even though the fish line goes slack.

In the usual movement of the hook through the water, the hook will thread through or pass any obstructions since the point is concealed by the loop member 28. As soon as a fish grabs the hook, the loop member 28 is dislodged from behind the barb, making the point 12 available to hook the fish. The loop member 28, being small and without obstructions, does not interfere with hooking the fish initially or subsequently playing the fish.

Figure 4:
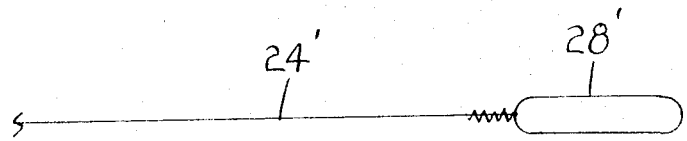
FIG. 4 is a view similar to FIG. 3 but showing a second form of guard.

FIG. 4 illustrates a modification of the invention wherein the guard, similar to FIG. 3, comprises a loop 28', but in this embodiment such loop is formed by tying it in the line itself. In other words, the loop is not a separate rigid metal member but instead merely comprises an eye tied in the end of the line. Such loop engages the barb 16 in the same way as the member 28 in the first described embodiment.

Figure 5:
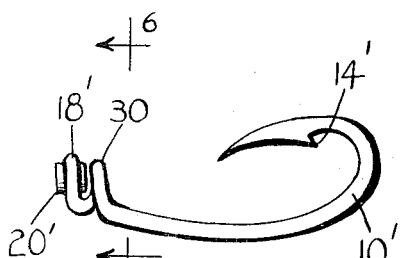
FIG. 5 is a side elevational view of a modification of fishhook used in the assembly.
Figure 6:
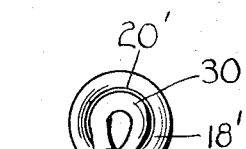
FIG. 6 is an enlarged sectional view taken on the line 6—6 of FIG. 5.

FIGS. 5 and 6 illustrate a modification wherein the fishhook 10' includes an abutment 30 on the forward side of eye 18'. Eye 18' supports a friction bushing 20' mounted in the eye in the same manner as illustrated in FIG. 1. The abutment 30 comprises an extra eye formed in the shank of the hook forward of the eye 18'. The size of the opening in the eye 30 is smaller in all directions than the width of the loop member 28 so that the latter cannot travel therethrough. The hook of FIG. 5 is associated with a line 24 and loop member 28 as shown in FIG. 3, and to place the loop in guarding position it is hooked behind the barb 14'. The purpose of the abutment 30 is that the loop 28 or 28' will engage against the abutment 30 rather than against the bushing 20' when the said loop is dislodged from the barb by a fish, whereby there is no possibility that said bushing can be dislodged by a heavy tug on the line.

Figure 7:
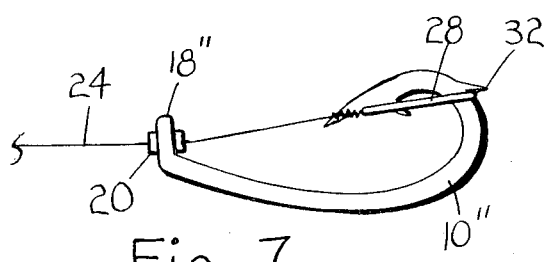
FIG. 7 is a side elevational view showing use of the present device with a somewhat modified form of fishhook.

FIG. 7 illustrates a concept of the invention wherein a fishhook 10'' has an additional barb 32 on the curved end opposite from the eye 18''. This hook, similar to the main embodiment, has a friction bushing 20. To connect the present guard to the hook, it is placed behind the barb 32 which as shown provides guarding protection for the point of the hook. When a fish strikes the hook, the loop member is dislodged in a downward direction around the main shank portion of the hook. The loop member, similar to the other embodiments, will be disposed in an out of the way position so as not to interfere with the hooked engagement of the fish or playing of the fish.

In accordance with the present invention, a fishhook is provided which will not snag when drawn through or past obstructions in the water and which will be readily available to hook the fish when a fish strikes. The portion of the line 24 which extends between the friction bushing 20 and the loop member 28 will remain taut even though the fish line becomes slack, and thus the loop member 28 will remain engaged at all times except when dislodged by a fish.

It is to be understood that the forms of my invention herein shown and described are to be taken as preferred examples of the same and that various changes in the shape, size and arrangement of parts may be resorted to without departing from the spirit of my invention.

Having thus described my invention, I claim:

1. In combination, a fishhook assembly comprising a shank portion leading into a curved portion terminating in a sharpened tip end, a barb on said hook inside the curvature of said curved portion, an eye at the other end of said shank, a friction bushing mounted in said eye having a bore therein with an axis directed approximately towards said barb, a line extending through said bore in friction engagement, and loop means on an end of said line arranged to engage behind the barb of the hook to guard the point of the hook against snagging of obstructions in the water.

2. The fishhook assembly of claim 1 wherein said loop means comprises an elongated substantially rigid member.

3. The fishhook assembly of claim 1 wherein said loop means comprises a loop tied in the end of said line.

4. The fishhook assembly of claim 1 wherein said eye extends angularly relative to an adjacent portion of the shank of the hook for supporting said friction bushing in position.

5. The fishhook assembly of claim 1 wherein said friction bushing is gripped in said eye and the size of said bore therethrough and thus the friction grip on said line is arranged to be varied by tightening said eye on the bushing to distort the latter.

6. The fishhook assembly of claim 5 wherein said line has a rough surface to increase the friction grip by said bushing thereon.

7. The fishhook assembly of claim 1 including a second barb located on the outside of the curvature of said curved portion whereby said loop means is arranged to be hooked behind said second barb in its guarding position.

8. The fishhook assembly of claim 1 including an abutment on said shank between said eye and said barb whereby said loop means is arranged to engage said abutment when released from the barb and a pull occurs on the hook.

9. The fishhook assembly of claim 8 wherein said abutment comprises an eye formed in the shank of said hook, the opening of said eye being smaller than the lateral dimension of said loop means.

* * * * *